United States Patent
Sivasubramanian et al.

(10) Patent No.: US 9,488,114 B2
(45) Date of Patent: Nov. 8, 2016

(54) CONTROL STRATEGY FOR DUAL GASEOUS AND LIQUID FUEL INTERNAL COMBUSTION ENGINE

(71) Applicant: Caterpillar Inc., Peoria, IL (US)

(72) Inventors: Arvind Sivasubramanian, Peoria, IL (US); Christopher F. Gallmeyer, Peoria, IL (US); David James Lin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1010 days.

(21) Appl. No.: 13/677,441

(22) Filed: Nov. 15, 2012

(65) Prior Publication Data

US 2014/0136080 A1 May 15, 2014

(51) Int. Cl.
*F02D 19/06* (2006.01)
*F02D 41/00* (2006.01)
*F02D 35/02* (2006.01)
*F02D 41/14* (2006.01)
*F02D 19/08* (2006.01)

(52) U.S. Cl.
CPC ......... *F02D 19/0623* (2013.01); *F02D 19/061* (2013.01); *F02D 19/081* (2013.01); *F02D 35/027* (2013.01); *F02D 41/0027* (2013.01); *F02D 41/1446* (2013.01); *F02D 19/0628* (2013.01); *Y02T 10/36* (2013.01)

(58) Field of Classification Search
CPC ........... F02D 41/0007; F02D 41/0027; F02D 19/0623; F02D 19/081; F02D 19/10; F02D 35/027; F02B 7/06; F02B 7/08; Y02T 10/32; Y02T 10/36

See application file for complete search history.

(56) References Cited

U.S. PATENT DOCUMENTS

| | | | | |
|---|---|---|---|---|
| 4,953,515 A | | 9/1990 | Fehr et al. | |
| 5,370,097 A | * | 12/1994 | Davis | F02D 19/0631 123/27 GE |
| 5,398,724 A | * | 3/1995 | Vars | F02D 41/20 123/490 |
| 5,533,492 A | * | 7/1996 | Willey | F02D 41/0027 123/488 |
| 5,868,121 A | * | 2/1999 | Brown | F02D 19/027 123/525 |
| 5,937,800 A | * | 8/1999 | Brown | F02B 7/06 123/27 GE |
| 5,975,050 A | * | 11/1999 | Brown | F02B 7/06 123/27 GE |
| 6,000,384 A | * | 12/1999 | Brown | F02D 19/0631 123/436 |
| 6,055,963 A | * | 5/2000 | Brown | F02D 41/0027 123/525 |
| 6,101,986 A | * | 8/2000 | Brown | F02D 19/0628 123/27 GE |
| 6,158,418 A | * | 12/2000 | Brown | F02D 19/0631 123/435 |
| 6,289,871 B1 | * | 9/2001 | Brown | F02D 19/0628 123/299 |
| 6,289,877 B1 | * | 9/2001 | Weisbrod | F02D 31/002 123/352 |
| 6,305,351 B1 | * | 10/2001 | Neumann | F02D 41/0027 123/352 |
| 6,474,323 B1 | * | 11/2002 | Beck | F02B 29/0418 123/679 |
| 6,666,185 B1 | * | 12/2003 | Willi | F02D 35/023 123/299 |

(Continued)

*Primary Examiner* — Mahmoud Gimie
*Assistant Examiner* — John Zaleskas
(74) *Attorney, Agent, or Firm* — Baker & Hostetler LLP (57) ABSTRACT

A control system for a dual gaseous and liquid fuel engine includes an electronic controller configured to receive data from a plurality of sensing mechanisms indicative of an error in a plurality of different engine operating parameters. The electronic controller is further configured to determine a highest priority one of the errors, and limit substitution of the gaseous fuel responsive to a normalized value thereof.

13 Claims, 3 Drawing Sheets

(56) References Cited

U.S. PATENT DOCUMENTS

| | | | |
|---|---|---|---|
| 7,019,626 B1* | 3/2006 | Funk | F02D 19/0647 123/205 |
| 7,093,588 B2* | 8/2006 | Edwards | F02D 19/0631 123/525 |
| 7,509,209 B2 | 3/2009 | Davis et al. | |
| 2009/0076712 A1* | 3/2009 | Bockhoff | F02D 19/022 701/103 |
| 2010/0198486 A1 | 8/2010 | Streib et al. | |
| 2011/0114058 A1* | 5/2011 | Cohn | F02B 43/00 123/25 A |
| 2011/0257869 A1* | 10/2011 | Kumar | B61L 3/006 701/103 |
| 2011/0288745 A1* | 11/2011 | Warner | F02D 41/0027 701/103 |
| 2012/0085326 A1 | 4/2012 | Mo et al. | |

\* cited by examiner

CONTROL STRATEGY FOR DUAL GASEOUS AND LIQUID FUEL INTERNAL COMBUSTION ENGINE

TECHNICAL FIELD

The present disclosure relates generally to dual gaseous and liquid fuel internal combustion engines, and relates more particularly to limiting substitution of gaseous fuel for liquid fuel responsive to a highest priority error in a plurality of engine operating parameters.

BACKGROUND

Internal combustion engines configured to operate with either liquid fuel, or a mixture of both liquid and gaseous fuels, are well known and increasingly used. There are many environments where engine power is desirable, and where gaseous fuel is more readily available or at a lower cost than liquid fuel. Examples include at certain landfills, wellheads, and some fuel transfer and distribution centers. In such applications it is often desirable to utilize the gaseous fuel for engine power as much as possible, relying on liquid fuel no more than necessary or practicable.

One known engine design within the above-mentioned general class employs an operator controlled mechanism for varying a relative amount of gaseous fuel in a mixture of gaseous and liquid fuels combusted within cylinders in the engine. In this design, a relatively small amount of liquid fuel will always be injected, but used at least predominantly as a pilot to ignite a main charge of gaseous fuel. The operator can adjust the relative amount of gaseous fuel in an attempt to optimize its use, for controlling fuel costs or for other reasons such as minimizing certain emissions. Such systems may work adequately, but have their drawbacks. Among these can be a need to be conservative as to the relative amount of gaseous fuel to avoid problems in operating the engine that might otherwise result.

U.S. Pat. No. 4,953,515 to Fehr et al. is directed to a diesel engine secondary fuel injection system, where a secondary fuel such as propane is injected into the engine in an amount which varies as a function of a monitored parameter. The monitored parameter is stated to include turbocharger boost pressure, fuel pressure in diesel fuel injector galleries, intake manifold pressure or combinations of such parameters. While Fehr may offer advantages, the principle purpose of the concept appears to be for performance enhancement, and the strategy is likely less applicable where different goals are sought.

SUMMARY

In one aspect, a control system for a dual gaseous and liquid fuel internal combustion engine includes a plurality of sensing mechanisms each configured to monitor a different engine operating parameter during substitution of the gaseous fuel for the liquid fuel in the internal combustion engine. The control system further includes an electronic controller configured to receive data from each of the sensing mechanisms indicative of an error in a corresponding engine operating parameter, and to normalize the errors. The electronic controller is further configured to determine a highest priority one of the errors responsive to normalized values thereof, and to limit the substitution of the gaseous fuel via outputting a control command based at least in part on the normalized value of the highest priority error to a gaseous fuel delivery mechanism in the internal combustion engine.

In another aspect, a method of controlling a dual gaseous and liquid fuel internal combustion engine includes receiving data indicative of an error in each of a plurality of different engine operating parameters, during substitution of the gaseous fuel for the liquid fuel in the internal combustion engine. The method further includes normalizing the errors, and determining a highest priority one of the errors responsive to normalized values thereof. The method further includes limiting the substitution of the gaseous fuel for the liquid fuel responsive to the normalized value of the highest priority error.

In still another aspect, a dual gaseous and liquid fuel internal combustion engine system includes an engine having a engine housing defining a plurality of cylinders, and an intake conduit coupled to the engine housing and having a combustion air inlet. The engine system further includes a liquid fuel delivery mechanism coupled to the engine housing for supplying a liquid fuel to the plurality of cylinders, and a gaseous fuel delivery mechanism coupled with the intake conduit and configured to convey a gaseous fuel into the intake conduit. The engine system further includes a plurality of sensing mechanisms each configured to monitor a different operating parameter of the engine, and an electronic controller configured to receive data from each of the sensing mechanisms indicative of an error in the corresponding operating parameter, to normalize the errors, and to determine a highest priority one of the errors responsive to normalized values thereof. The electronic controller is further in control communication with the gaseous fuel delivery mechanism, and configured to limit a substitution of the gaseous fuel for the liquid fuel in the engine via outputting a control command to the gaseous fuel delivery mechanism based at least in part on the normalized value of the highest priority error.

DETAILED DESCRIPTION

Figure 1:
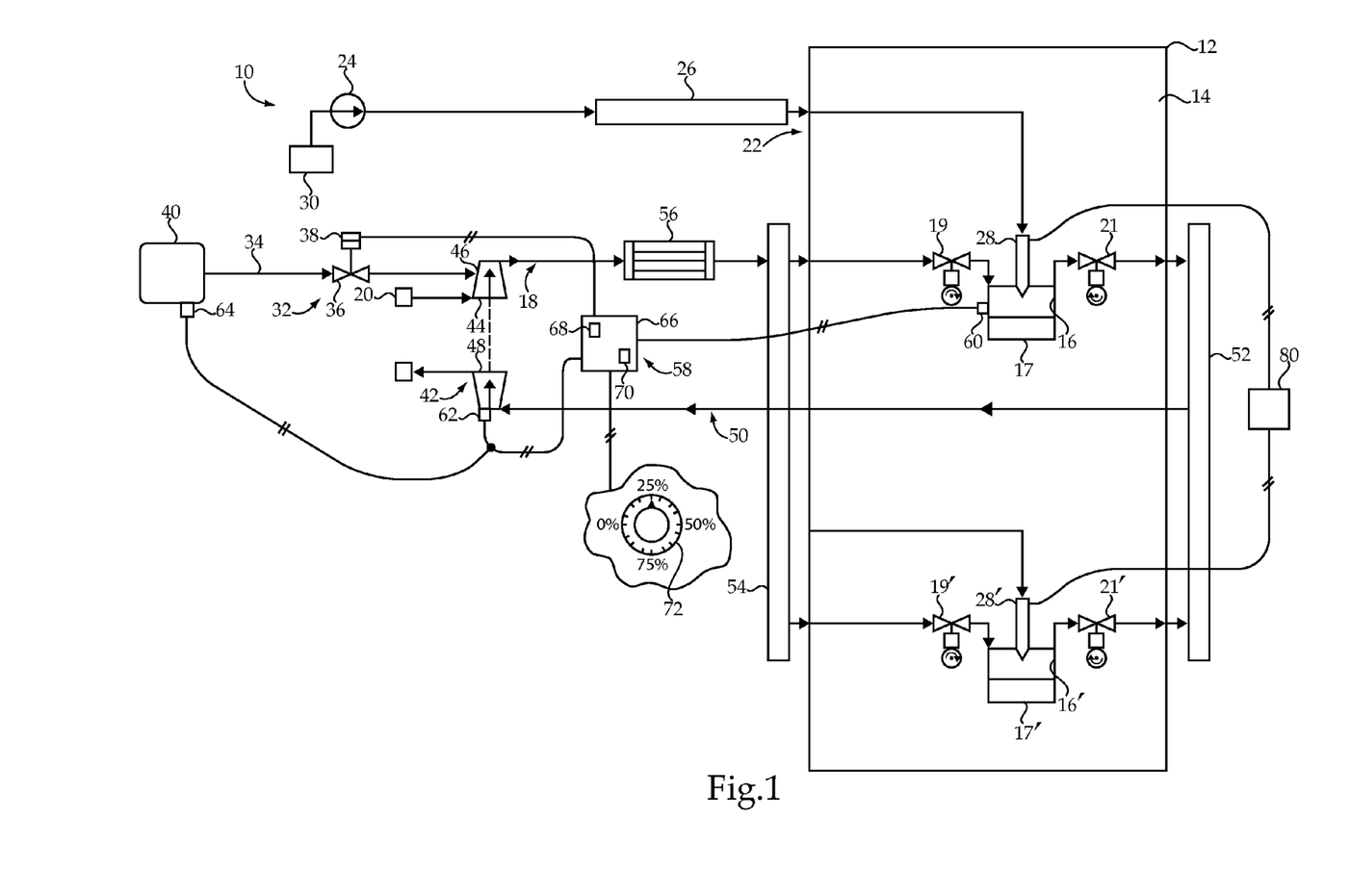
FIG. 1 is a schematic view of an internal combustion engine system according to one embodiment.

Referring to FIG. 1, there is shown a dual gaseous and liquid fuel internal combustion engine system 10 according to one embodiment. Engine system 10 includes an engine 12 having an engine housing 14 defining a plurality of cylinders 16 and 16'. Engine 12 further includes an intake conduit 18 coupled to engine housing 14 and having a combustion air inlet 20. A plurality of pistons 17 and 17' are reciprocable within cylinders 16 and 16', respectively. A plurality of intake valves 19 and 19', which may be cam-actuated, control fluid communications between intake conduit 18 and cylinders 16 and 16'. A plurality of exhaust valves 21 and 21', which may also be cam-actuated, control fluid communications between cylinders 16 and 16' and an exhaust conduit 50. An intake manifold 54 fluidly connects intake conduit 18 with each of cylinders 16 and 16', and an exhaust manifold 52 fluidly connects cylinders 16 and 16' with an exhaust conduit 50. As noted above, engine system 10 may be configured for operation via a liquid fuel, or a mixture of gaseous and liquid fuels at a range of different proportions of the respective fuels. As will be further apparent from the following description, engine system 10 may be uniquely configured to limit a substitution of the gaseous fuel for liquid fuel under certain circumstances.

Engine system 10 further includes a liquid fuel delivery mechanism 22 coupled to engine housing 14 for supplying liquid fuel to cylinders 16 and 16', and any other such cylinders which engine 12 might include. Mechanism 22 may be configured to supply any suitable liquid fuel, in any suitable way, but in a practical implementation strategy includes a plurality of fuel injectors 28 and 28' each positioned at least partially within a corresponding one of cylinders 16 and 16'. Mechanism 22 may also include a supply of liquid fuel such as a distillate diesel fuel, and a fuel pressurization pump 24 configured to pressurize and supply the liquid fuel to a common rail 26, in turn fluidly connected with fuel injectors 28 and 28'. A low pressure fuel transfer pump (not shown) might also be employed. In other embodiments, rather than a common rail system, fuel injectors 28 and 28' might be unit pump fuel injectors. An electronic controller 80 such as a conventional fueling governor may be in control communication with fuel injectors 28 and 28'.

Engine system 10 may further include a gaseous fuel delivery mechanism 32 coupled with intake conduit 18 and configured to convey a gaseous fuel into intake conduit 18. Mechanism 32 may include a gaseous fuel supply conduit 34 connecting a supply of gaseous fuel 40 with a gaseous fuel inlet 46 to intake conduit 18. In a practical implementation strategy, mechanism 32 may further include an electrically actuated gaseous fuel substitution valve 36 positioned fluidly between gaseous fuel supply conduit 34 and gaseous fuel inlet 46. Valve 36 may include an electrical actuator 38. Engine system 10 may further include a turbocharger 42 having a compressor 44 within intake conduit 18, and a turbine 48 within exhaust conduit 50. Compressor 44 may define gaseous fuel inlet 46, or more particularly gaseous fuel inlet 46 may be formed in a housing of compressor 44. An aftercooler 56 may be positioned within intake conduit 18 to cool and condense a mixture of gaseous fuel supplied via mechanism 32 and intake air entering intake conduit 18 via inlet 20, in a conventional manner. Engine 12 may be a compression ignition engine, and as noted above configured to operate via mixtures of liquid and gaseous fuel. In a practical implementation strategy, liquid fuel injected via mechanism 22 into cylinders 16 and 16' may autoignite approximately at the end of compression strokes of pistons 17 and 17'. Where gaseous fuel is within cylinder 16 and 16', during substitution of the gaseous fuel for the liquid fuel, ignition of the liquid fuel can serve to ignite the gaseous fuel.

As noted above, mechanism 32 may include electrically actuated substitution valve 36. The term "substitution" should be understood in a manner consistent with its usage in the dual gaseous and liquid fuel engine art. It will thus be understood that substitution of gaseous fuel for liquid fuel means that rather than relying solely upon heat release derived from the combustion of liquid fuel to meet the power demands on engine system 10, gaseous fuel is used in place of some of the liquid fuel that would otherwise be required. This general strategy enables relatively conservative amounts of liquid fuel to be consumed in operating engine system 10, providing economic advantages where gaseous fuel is readily available and liquid fuel is not, or where liquid fuel is substantially more expensive than gaseous fuel.

For purposes of requesting a rate of gaseous fuel substitution, engine system 10 may further include an operator input device 72 having a plurality of states corresponding to a plurality of different gaseous fuel substitution rates. Device 72 thus allows an operator to request a rate of gaseous fuel substitution during operating engine system 10. By way of input device 72 an operator might request, say, 25% gaseous fuel substitution, in which case gaseous fuel substitution may be set at or adjusted toward a state at which 25% of a power output requirement on engine system 10 is accommodated by gaseous fuel. In some instances, engine system 10 may be configured to operate at a gaseous fuel substitution rate up to 70% or even higher, absent circumstances which otherwise require limitation of the gaseous fuel substitution rate as further described herein.

Engine system 10 may further include a control system 58 configured to limit a substitution of the gaseous fuel for the liquid fuel. Control system 58 may include a plurality of sensing mechanisms each configured to monitor a different operating parameter of engine 12. In a practical implementation strategy, control system 58 includes a detonation sensing mechanism 60, which might include a pressure sensor, exposed to a fluid pressure of cylinder 16. Mechanism 60 could include additional pressure sensors for analogous purposes associated one with each of any number of other cylinders of engine 12. Control system 58 may further include a temperature sensing mechanism 62 configured to sense a turbine temperature in turbocharger 42, and a pressure sensing mechanism 64 configured to sense a pressure of gaseous fuel supply 40. Sensing mechanism 60 may thus be understood to monitor a detonation parameter, mechanism 62 configured to monitor a temperature parameter, and mechanism 64 configured to monitor a pressure parameter.

It has been observed that each of these parameters, and likely numerous others, can exhibit a state which justifies limiting a substitution of gaseous fuel for the liquid fuel, by way of slowing a rate of increase in the substitution, stopping an increase in the substitution, or decreasing the substitution. For instance, where detonation or knock is detected via sensor 60, it may be desirable to back off the rate of gaseous fuel substitution. Similarly, where turbine temperature as indicated via sensing mechanism 62 is higher than a desired temperature, this could represent a situation where combustion of unburned gaseous fuel in turbine 58 or in a downstream exhaust stack or the like is considered likely, and it is thus desirable to limit gaseous fuel substitution. In the case of mechanism 64, an unduly low pressure might suggest that insufficient gaseous fuel will be available for successful substitution or be difficult to control. Where too high, other problems could occur, such as causing an inordinate amount of gaseous fuel to be conveyed into intake conduit 18 or likewise be problematic to control.

Control system 58 may further include an electronic controller 66 configured to receive data from each of sensing mechanisms 60, 62, 64 and any other such sensing mechanisms as might be used, indicative of an error in the corresponding operating parameter. Electronic controller 66 may include a data processor 68, and a computer readable memory 70 of any suitable type storing computer executable program instructions. Data processor 68 may, by way of executing the instructions, process the data from sensing mechanisms 60, 62, and 64, and act upon the same as further described herein to limit substitution of the gaseous fuel.

Electronic controller 66 may be further configured to normalize the errors, and to determine a highest priority one of the errors responsive to normalized values thereof. Electronic controller 66 is further in control communication with gaseous fuel delivery mechanism 32, and in particular with actuator 38, and configured to limit a substitution of the gaseous fuel for the liquid fuel via outputting a control command to mechanism 32 based at least in part on the normalized value of the highest priority error. As will be further apparent from the following description, among other things this general strategy of prioritizing errors and acting upon a highest priority one of the errors enables a single controller optimized and calibrated for only one of the operating parameters of interest to control engine system 10 based upon any one of the errors having a highest priority. Another way to understand this principle is as a solution to a multiple input single output problem. In other words, only one variable may exist which can control gaseous fuel substitution, a position or otherwise a state of delivery mechanism 32. There are nevertheless a number of different variables which can affect the desirability of gaseous fuel substitution under different circumstances. As discussed above, detonation, turbine temperature, supply pressure, and potentially still other parameters bear on the suitability of a particular rate of gaseous fuel substitution. While theoretically different control logic might be implemented for independently monitoring and acting upon each of these different operating parameters, the presently contemplated control strategy is expected to be much simpler and more elegant.

Figure 2:
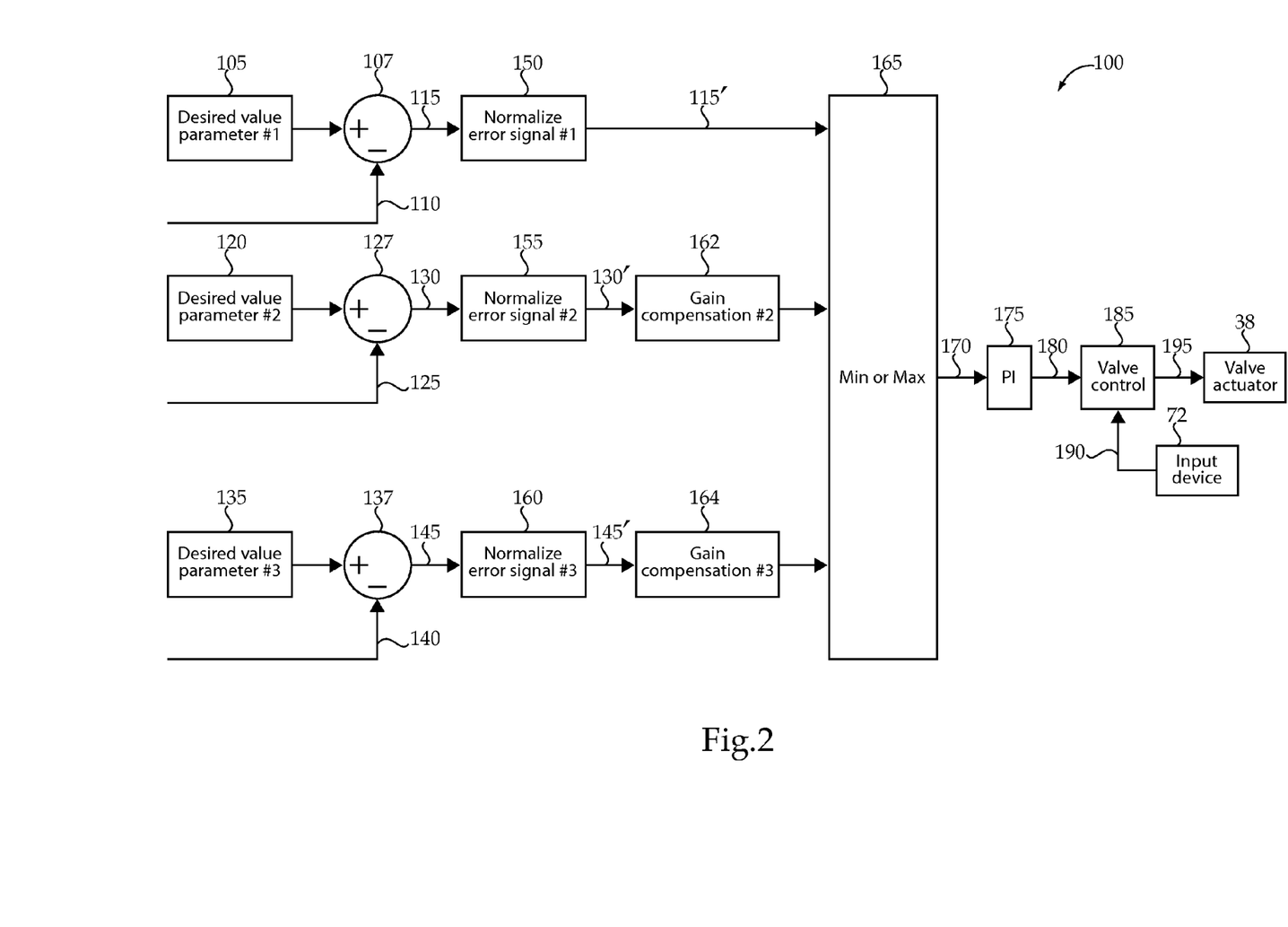
FIG. 2 is a block diagram of an internal combustion engine control strategy, according to one embodiment.

Referring also now to FIG. 2, there is shown a block diagram 100 of a control strategy according to the present disclosure and representing functions executed via electronic controller 66. In block diagram 100, a first signal 110 indicative of a measured value for a first parameter, a second signal 125 indicative of a measured value for a second parameter, and a third signal 140 indicative of a measured value for a third parameter are each received. Electronic controller 66 may read a stored desired value for the first parameter at block 105, a stored desired value for the second parameter at block 120, and a stored desired value for the third parameter at block 35, each of which may be stored on memory 70. In block 107, electronic controller 66 may determine an error signal 115 responsive to a difference between the desired and measured values for the first parameter, at block 127 determine another error signal 130 responsive to a difference between the desired and measured values for the second parameter, and at block 137 determine yet another error signal 145 responsive to a difference between desired and measured values for the third parameter.

At blocks 150, 155 and 160, electronic controller 66 may normalize the errors corresponding to signals 115, 130, and 145, respectively. At block 162 and block 164, electronic controller 66 may apply a compensating gain to normalized errors for the second and third parameters, respectively. The processing in blocks 150, 155 and 160, as well as blocks 162 and 164 can all be understood as "normalizing," as that term is intended to be understood. Thus, blocks 150, 155 and 160 may be understood as a first normalizing step, and blocks 162 and 164 as a subsequent normalizing step. At block 165, electronic controller 66 may compare normalized values of the errors, for example determining a minimum value or a maximum value and responsively generate a signal 170. Those skilled in the art will appreciate that in block 165 electronic controller 66 could determine which of the errors has a highest value or a lowest value, either the lowest or highest being indicative of which of the errors is of highest priority. Additional details of normalizing the errors in blocks 150-164 are further discussed below. It should be appreciated that descriptions herein of actions taken on an error also contemplate actions taken on a signal indicative of an error. In other words, while the actual error itself may be literally only a numerical quantity, taking action on an error, such as normalizing an error, is fairly understood to include calculating or otherwise determining a new numerical quantity based on a numerical quantity encoded in a signal.

Signal 170 may be received by a proportional controller such as a proportional integral (PI) controller at block 175, which calculates a control term and responsively generates another signal 180. Signal 180 may be received in a valve control block 185. In valve control block 185, electronic controller 66 may be understood as determining a positioning value for valve 36 responsive to an input 190 from input device 72, and modifying the positioning value based upon signal 180 to determine a control command 195 for valve actuator 38. For instance, in block 185 electronic controller 66 might look up a stored positioning value from a map having as a coordinate a value indicated by input 190.

In a practical implementation strategy, in control block 175 electronic controller 66 may calculate a control term which is a multiplier, including a dimensionless numerical value, and the positioning value determined in block 185 may be multiplied via the multiplier such that the control command 195 is a product of the positioning value and the multiplier. In this general manner, electronic controller 66 will be understood to be determining a value for positioning valve 32 responsive to what an operator has requested, but then determine the actual control command 195 responsive to the processing of the error signals such that the actual control command 195 to valve actuator 38 can limit gaseous fuel substitution where appropriate.

INDUSTRIAL APPLICABILITY

From the foregoing description, it will be understood that control system 58 monitors each of the operating parameters of interest while engine system 10 is running. It will also be recalled that electronic controller 66 is determining a highest priority one of the errors in those operating parameters, and acting on the highest priority one of the errors to control substitution of the gaseous fuel for the liquid fuel. Some of the time, the errors may not be sufficiently large to indicate that gaseous fuel substitution needs to be limited, and the gaseous fuel substitution rate will be determined by what the operator is requesting via input device 72. On certain occasions, however, electronic controller 66 may determine that gaseous fuel substitution needs to be limited to avoid undesired effects on engine system 10. In such instances, and commonly where electronic controller 66 receives an input indicative of a requested increase in gaseous fuel substitution, electronic controller 66 may act to override the requested increase via the control command sent to valve actuator 38. As a result, a proportion of gaseous fuel in a mixture of the gaseous and liquid fuels combusted within cylinders 16 and 16' of engine 10 may be stopped from increasing, slowed in a rate of increase, and in some instances reduced.

Based upon factors such as sensing hardware and the nature of the parameter being monitored, raw error values for each of the parameters of interest alone may be insufficient to determine which of the errors should be considered the highest priority and thus acted upon. In other words, output from one sensor might be anywhere from −1V to +2V. Output from another sensor might be from 0V to 2V, and output from yet another sensor might be from −0.1V to plus +0.1V. Simply comparing raw error values in such an instance may not indicate a relative severity or an importance of the error. For these and other reasons, the errors are normalized. In particular, normalizing the errors may include scaling the errors to a common band, which could occur in control blocks 150, 155 and 160 of FIG. 2. Determining a highest priority one of the errors may include comparing normalized values of the errors. Limiting the substitution of the gaseous fuel for the liquid fuel may thus occur responsive to the normalized value of the highest priority error.

It will also be recalled that electronic controller 66 may be designed and calibrated for one of the operating parameters. The one of the operating parameters may be understood as a principle operating parameter. The other operating parameters may be understood as a plurality of secondary operating parameters, and electronic controller 66 may be configured to normalize the errors via non-dimensionally scaling at least one and typically all of the raw error values in each of the plurality of secondary operating parameters. The error in the principle operating parameter may also be scaled, although the common band might be defined by a range of possible raw error values in the principle operating parameter. In a practical implementation the errors might all be scaled to a common band from −1 to +1. In one embodiment, the principle operating parameter includes the detonation parameter mentioned above which is monitored via detonation sensing mechanism 60.

Normalizing the errors may further include adjusting scaled error values in each of the plurality of secondary operating parameters according to a plurality of different gains. The different gains may each be based at least in part on a response time of the corresponding operating parameter, and in particular a response time of the secondary operating parameter relative to a response time of the principle operating parameter. Certain operating parameters such as detonation may have a relatively fast response time, meaning that the presence or absence of detonation can be changed almost instantaneously by changing the gaseous fuel substitution rate. Other operating parameters may have relatively slower response times, such as turbine temperature which could take numerous engine cycles to change. Another way to understand this principle, is that by way of the different gain terms, electronic controller 66 may account for how quickly engine system operation could be modified, and factoring in this characteristic in determining which operating parameter to act upon in controlling and in particular limiting gaseous fuel substitution. Errors in parameters having a relatively faster response time might be modified via a relatively larger gain, whereas errors in parameters having a relatively slower response time might be modified via a relatively smaller gain.

Figure 3:
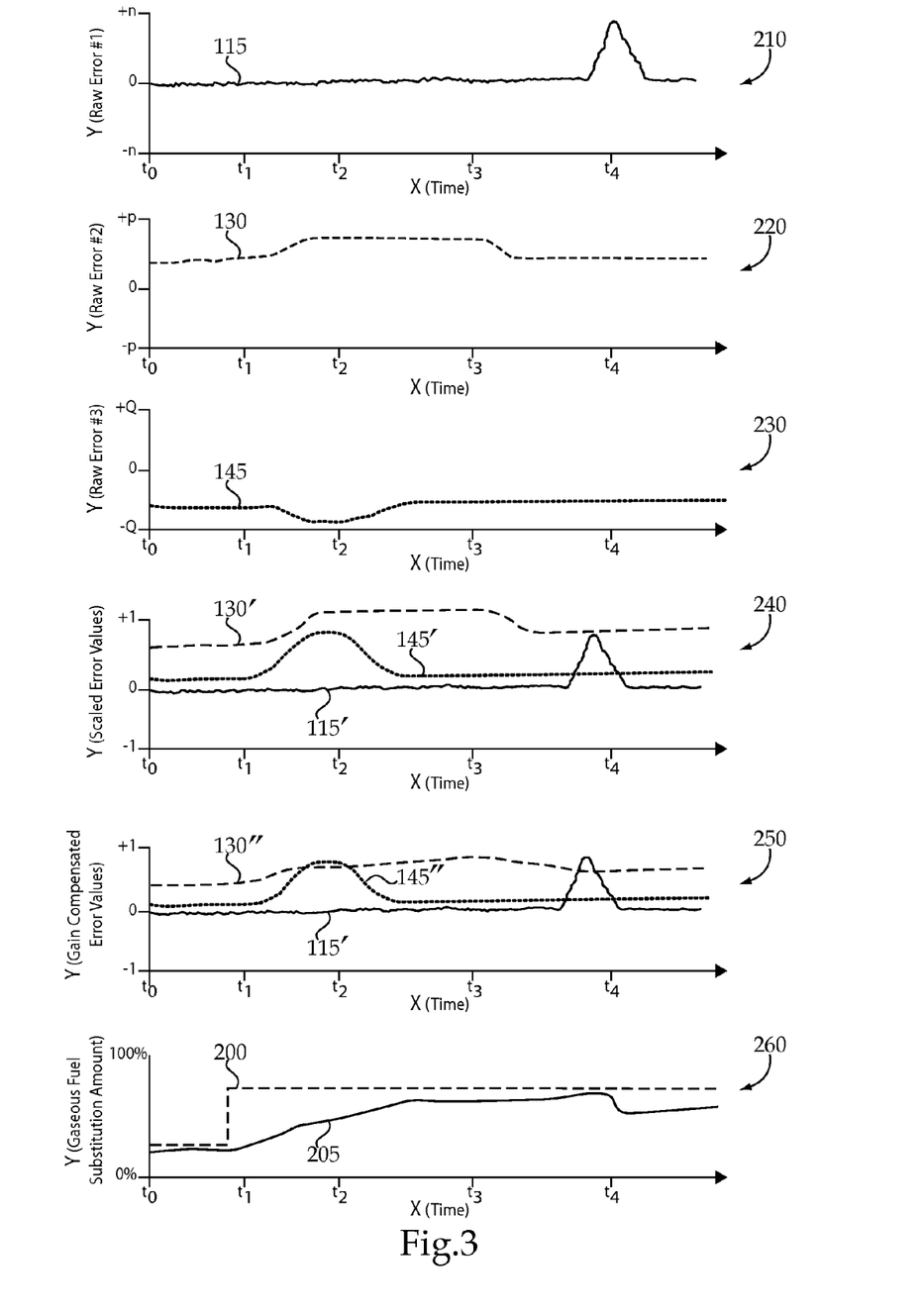
FIG. 3 is a plurality of graphs showing a plurality of different signal traces relating to operation of an internal combustion engine, according to one embodiment.

Referring now to FIG. 3, there are shown a plurality of graphs of signal traces for raw error values for the first, second, and third parameters in graphs 210, 220 and 230, respectively. In particular each of error signals 115, 130, and 145 is shown from a time $t_0$ to a time $t_4$. In graph 240, there are shown each of the errors as scaled to a common band and now shown with reference numerals 115', 130' and 145'. It will be noted that at least in the example shown scaling the errors to a common band can change shapes of the signal traces, signs, and amplitudes. In graph 250, each of the errors is thus shown as it might appear where scaled to a common band from −1 to +1. In graph 250, there are shown the three errors where the second and third have been modified via compensating gain terms and with reference numerals 115', 145" and 130"'. The first, principle operating parameter may have an effective gain of 1 relative to the other operating parameters, and thus is unmodified from graph 240. In graph 260, there are shown a requested gaseous fuel substitution rate 200, and an actual gaseous fuel substitution rate 205.

From the graphs of FIG. 3 it can be seen that a requested increase in gaseous fuel substitution occurs at time $t_0$. From time $t_0$ to time $t_2$ a change in raw error value occurs in the second operating parameter and the third operating parameter. Each of times $t_1$-$t_4$ may be understood as a time at which electronic controller 66 acts to control gaseous fuel substitution responsive to the several errors. It will be recalled that limiting gaseous fuel substitution occurs responsive to a normalized value of the highest priority error. Graph 250 shows the normalized values having been scaled and gain compensated. It may be noted that the third operating parameter has the highest value at time $t_2$. The second operating parameter has the highest value at time $t_1$ and time $t_3$, though might not be acted upon at time $t_1$. The third operating parameter has the highest value at time $t_4$. Accordingly, electronic controller 66 may determine the multiplier responsive to the normalized values of the highest priority errors at the different time periods as shown in graph 250. It may also be noted that at about time $t_2$ a rate of increase in the gaseous fuel substitution amount is slowed. At about time $t_3$, the gaseous fuel amount is stopped from further increasing, but begins to modestly increase again approaching time $t_1$. At about time $t_4$, the gaseous fuel substitution amount is relatively sharply decreased, as might be expected where detonation is detected.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A control system for a dual gaseous and liquid fuel internal combustion engine, the control system comprising:
    a plurality of sensing mechanisms configured to monitor a plurality of engine operating parameters,
        each sensing mechanism of the plurality of sensing mechanisms being configured to monitor a different engine operating parameter of the plurality of engine operating parameters during an increase in a proportion of a gaseous fuel relative to a liquid fuel in the internal combustion engine,
        the plurality of sensing mechanisms including at least one temperature sensing mechanism, and a detonation sensing mechanism,
        the plurality of engine operating parameters including a principal operating parameter and a plurality of secondary operating parameters; and
    an electronic controller configured to
        receive an operator-defined signal that changes a target proportion of the gaseous fuel relative to the liquid fuel from a first non-zero value to a second non-zero value,
        generate a first control command signal based at least in part on the operator-defined signal,
        receive a sensing signal from each sensing mechanism,
        determine an error between a value corresponding to the signal from each sensing mechanism and a corresponding target value, thereby generating a plurality of errors, normalize the plurality of errors by non-dimensionally scaling raw error values of each secondary operating parameter of the plurality of secondary operating parameters, and by scaling each error of the plurality of errors to a common band, thereby generating a plurality of normalized errors, determine a highest priority normalized error of the plurality of normalized errors by comparing the normalized errors of the plurality of normalized errors to one another, generate a second control command signal by modifying the first control command signal based on the highest priority normalized error, and limit the increase in the proportion of the gaseous fuel relative to the liquid fuel by outputting the second control command signal to a gaseous fuel delivery mechanism of the internal combustion engine.

2. The control system of claim 1, wherein the gaseous fuel delivery mechanism includes an electrically actuated substitution valve, and the electronic controller is further configured to limit the increase in the proportion of the gaseous fuel relative to the liquid fuel at least in part by adjusting a position of the substitution valve via the second control command signal.

3. The control system of claim 2, wherein the electronic controller is further configured to override the first control command signal with the second control command signal.

4. The control system of claim 3, wherein the first control command signal is a positioning value for the electrically actuated substitution valve responsive to the operator-defined signal, and the electronic controller is further configured to determine the second control command signal at least in part by modifying the positioning value responsive to the highest priority normalized error.

5. The control system of claim 1, wherein the principal operating parameter includes a detonation parameter monitored via the detonation sensing mechanism.

6. The control system of claim 1, wherein the electronic controller is further configured to normalize the plurality of errors by adjusting scaled error values in each secondary operating parameter according to a plurality of different gains, each gain of the plurality of different gains being based at least in part on a response time of the corresponding operating parameter.

7. A method for controlling a dual gaseous and liquid fuel internal combustion engine, the method comprising:
receiving an operator-defined signal that changes a target proportion of a gaseous fuel relative to a liquid fuel from a first non-zero value to a second non-zero value;
generate a first control command signal based at least in part on the operator-defined signal;
receiving, during an increase in a proportion of the gaseous fuel relative to the liquid fuel in the internal combustion engine, data indicative of an error in each engine operating parameter of a plurality of different engine operating parameters, thereby generating a plurality of errors, the plurality of different engine operating parameters including a primary operating parameter and a plurality of secondary operating parameters;
normalizing the plurality of errors by non-dimensionally scaling raw error values of each secondary operating parameter of the plurality of secondary operating parameters, and by scaling each error in the plurality of errors to a common band, thereby generating a plurality of normalized errors;

determining a highest priority normalized error of the plurality of normalized errors by comparing the normalized errors of the plurality of normalized errors to one another; and limiting the increase in the proportion of the gaseous fuel relative to the liquid fuel responsive to the highest priority normalized error.

8. The method of claim 7, wherein the limiting the increase in the proportion of the gaseous fuel relative to the liquid fuel includes reducing a proportion of the gaseous fuel in a mixture of the gaseous fuel and the liquid fuel burned within each cylinder of a plurality of cylinders of the internal combustion engine.

9. The method of claim 7, wherein the limiting the increase in the proportion of the gaseous fuel relative to the liquid fuel includes overriding the first control command signal.

10. The method of claim 9, wherein the first control command signal is a positioning value for an electrically actuated gaseous fuel substitution valve, and wherein the limiting the increase in the proportion of the gaseous fuel relative to the liquid fuel further includes
determining a second control command signal by modifying the first control command signal responsive to a multiplier based at least in part on the highest priority normalized error, and
outputting the second control command signal to an electrical actuator coupled with the substitution valve.

11. A dual gaseous and liquid fuel internal combustion engine system comprising:
an engine including an engine housing defining a plurality of cylinders, and an intake conduit coupled to the engine housing and defining a combustion air inlet;
a liquid fuel delivery mechanism coupled to the engine housing for supplying a liquid fuel to the plurality of cylinders;
a gaseous fuel delivery mechanism coupled with the intake conduit and configured to convey a gaseous fuel into the intake conduit;
a plurality of sensing mechanisms operatively coupled to the engine and configured to monitor a plurality of engine operating parameters,
each sensing mechanism of the plurality of sensing mechanisms being configured to monitor a different operating parameter of the engine,
the plurality of sensing mechanisms including at least one temperature sensing mechanism, and a detonation sensing mechanism, and
the plurality of engine operating parameters including a principal operating parameter and a plurality of secondary operating parameters; and
an electronic controller operatively coupled to the engine, the gaseous fuel delivery mechanism, and the liquid fuel delivery mechanism, the electronic controller being configured to
receive an operator-defined signal that changes a target proportion of the gaseous fuel relative to the liquid fuel from a first non-zero value to a second non-zero value,
generate a first control command signal based at least in part on the operator-defined signal,
receive a sensing signal from each sensing mechanism,
determine an error between a value corresponding to the signal from each sensing mechanism and a corresponding target value, thereby generating a plurality of errors, normalize the plurality of errors by non-dimensionally scaling raw error values of each secondary operating parameter of the plurality of secondary operating parameters, and by scaling each error of the plurality of errors to a common band, thereby generating a plurality of normalized errors, determine a highest priority normalized error of the plurality of normalized errors by comparing the normalized errors of the plurality of normalized errors to one another;

generate a second control command signal by modifying the first control command signal based on the highest priority normalized error; and limit an increase in the proportion of the gaseous fuel relative to the liquid fuel by outputting the second control command signal to the gaseous fuel delivery mechanism.

12. The engine system of claim 11, further comprising a compressor in fluid communication with the intake conduit and defining a gaseous fuel inlet; and a gaseous fuel supply conduit fluidly coupled to the gaseous fuel inlet, wherein the gaseous fuel delivery mechanism includes an electrically actuated gaseous fuel substitution valve disposed fluidly in series between the gaseous fuel supply conduit and the gaseous fuel inlet.

13. The engine system of claim 12, wherein the engine includes a compression ignition engine, and the liquid fuel delivery mechanism includes a plurality of fuel injectors, each fuel injector of the plurality of fuel injectors being positioned at least partially within one cylinder of the plurality of cylinders.

* * * * *

UNITED STATES PATENT AND TRADEMARK OFFICE
CERTIFICATE OF CORRECTION

PATENT NO. : 9,488,114 B2  
APPLICATION NO. : 13/677441  
DATED : November 8, 2016  
INVENTOR(S) : Sivasubramanian et al.

Page 1 of 1

It is certified that error appears in the above-identified patent and that said Letters Patent is hereby corrected as shown below:

On the Title Page

Column 2, Item (74) (Attorney, Agent, or Firm), Line 1, delete "Baker & Hostetler LLP" and insert -- Baker & Hostetler LLP; Hibshman Claim Construction PLLC --.

Signed and Sealed this
Twenty-first Day of February, 2017

Michelle K. Lee
*Director of the United States Patent and Trademark Office*